Oct. 28, 1969         J. H. HOLMES         3,474,499
TIRE MOLD CLAMPING RING

Filed Aug. 7, 1967                        2 Sheets-Sheet 1

INVENTOR.
JACK H. HOLMES
BY
Teare, Teare & Sammon
ATTORNEYS

Oct. 28, 1969   J. H. HOLMES   3,474,499
TIRE MOLD CLAMPING RING
Filed Aug. 7, 1967   2 Sheets-Sheet 2

INVENTOR.
JACK H. HOLMES
BY
Teare, Teare & Sammon
ATTORNEYS

United States Patent Office 3,474,499
Patented Oct. 28, 1969

---

3,474,499
TIRE MOLD CLAMPING RING
Jack H. Holmes, Parma Heights, Ohio, assignor to The James C. Heintz Company, Cleveland, Ohio, a corporation of Ohio
Filed Aug. 7, 1967, Ser. No. 658,801
Int. Cl. B29c 1/16
U.S. Cl. 18—43         10 Claims

ABSTRACT OF THE DISCLOSURE

A clamping device for use with a mold which has separable upper and lower sections each including recesses thereon. The device comprises a plurality of filler members disposed in the recesses for movement transversely thereof. A clamping band is disposed around and adjacent the juncture of the mold sections and has flanges for coacting interlocking engagement with the filler members. The band flanges are selectively adjustable with respect to the filler members to selectively vary the axial width of the mold.

BACKGROUND OF THE INVENTION

The invention relates to clamping devices for molds or the like, and more particularly to molds which are adapted to be expanded in the axial direction so as to provide molds having a plurality of different widths.

Molds of this general type have been used for vulcanizing tires and/or for the retreading of tires. As tire treads vary considerably in width, it is desirable to utilize a single expandable mold for a number of different size tires rather than to utilize a separate mold for each tire and/or tread size. Such molds are usually comprised of separable sections and envelope a spacer member of a given width which is inserted between the sections to maintain the sections in a spaced apart relation to achieve the increased mold width.

In prior devices, a different clamping band was utilized for each size mold requiring the removal of band completely from around the mold and the placement of a new band in its place This not only was costly, time consuming and cumbersome, but resulted in considerable inefficiency in the molding operation, such as in the vulcanizing of tires, or the like.

SUMMARY OF THE INVENTION

The present invention contemplates providing a clamping device for joining together separable mold sections and/or components thereof. The clamping device comprises a clamping means having flange means associated therewith which are adapted for clamping engagement with recess provided in the mold sections to hold the sections firmly together. Filler members disposed in the recesses are adapted for coacting engagement with the flange means of the clamping means. The filler members are adapted to be selectively disposed in the recesses enabling one mold section to be moved apart from the other section, thereby expanding the width of the mold. The expanded mold may be reclamped in the expanded position by means of the same clamping means as was used on the original mold prior to the axial widthwise expansion thereof.

The foregoing arrangement provides an expandable mold utilizing the same clamping means to obtain a plurality, such as at least three different mold sizes, and hence eliminates the need for a number of different size and/or type bands each time the width of the mold is required to be varied.

Moreover, the novel clamping arrangement of the present invention enables a single mold having mating sections and/or other component parts to be quickly and easily adjusted as to its widthwise dimensions for molding articles, such as tires, treads or the like, of varying size and which provides an effective clamping coacting locking engagement of the parts thereof, and particularly under relatively high pressure operating conditions.

DESCRIPTION OF THE PREFERRED EMBODIMENTS

Figure 2:
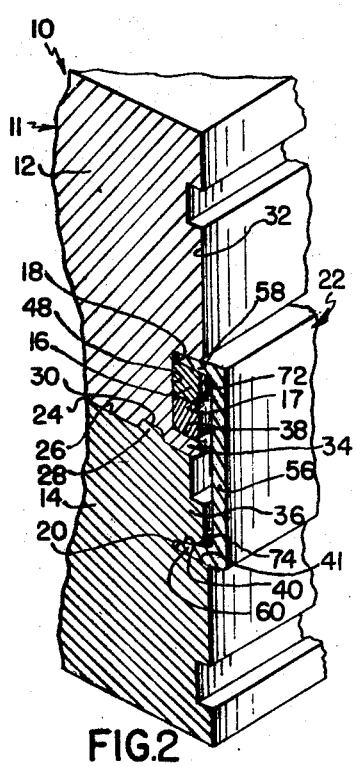
FIG. 2 is a fragmentary perspective section view of a two section mold joined together by the clamping device of the present invention.

Referring again to the drawings, there is illustrated in cross-section, generally at 10 of FIG. 2, a segmented portion of a multi-part mold with which the clamping device of the present invention may be used. The mold 10 comprises an upper section 12 and a lower section 14 which are adapted for mating engagement with one another and both of which may include recessed portions 18 and 20, respectively, disposed therein. Preferably, filler members 16 and 17 may be mounted in at least one of the recessed portions, such as at 18, and adapted for adjustable transverse movement therein. A clamping means 22 may be disposed about the periphery of the mold 10 so as to span the juncture between the upper and lower sections 12 and 14 for coacting engagement with the filler members 16 and 17 via certain of the recesses 18 and 20. By actuation of the clamping means 22 the mold sections 12 and 14 are drawn tightly together into abutting engagement with one another. By selective disposition of the filler members 16 and 17 with respect to their interlocking coacting engagement with the clamping means 22 there is provided an arrangement which enables the mold to be readily expanded in an axial or widthwise direction without the requirement of using different and/or auxiliary clamping equipment which has heretofore been the case with prior clamping devices.

The mold 10 herein referred to may comprise a mold body 11 which is preferably generally circular in configuration having an exterior surface 32, and an interior generally axially extending mold cavity 24 spaced radially inwardly from the exterior surface 32 and adapted for forming the article to be molded. The mold body 11 may include a pair of initially separate sections, such as the upper section 12 and the lower section 14, having sides 26 and 28, respectively, which are adapted to matingly engage one another in abutting relationship to provide the cavity 24.

One of these sections, such as the lower section 14, may have an annular projection 28 extending axially upwardly into a correspondingly shaped undercut channel 30 which may be disposed in the upper section 12 to prevent relative lateral shifting movement of the sections 12 and 14 with respect to one another.

In the embodiment of FIG. 2, the respective mold sections 12 and 14 are shown in superposed mating engagement at the parting line defined by side surfaces 26 and 28. In this position the axial widthwise dimension of the mold 10 and hence, that of the cavity 24 defined by sections 12 and 14 will be at a minimum dimension.

As shown, the upper and lower mold sections 12 and 14 are each provided with the recess portions 18 and 20 which extend around the entire periphery thereof and which extend radially inwardly in a direction toward the mold cavity 24. The recess 18 in the section 12 is preferably polygonal, such as rectangular, in shape and is of greater transverse width as compared to that of the other recess 20 in the mold section 14. The recess 18 is defined at its bottom (FIG. 2) by an annular projection 34 made integral with the section 12. The projection 34 has an upper supporting surface 38 which may be inclined downwardly and outwardly in a direction away from the mold cavity 24 to provide an interlocking support for the filler members, such as 16 and 17 as will hereinafter be more fully described.

The recess 20 in the mold section 14 in the form shown may be of a polygonal, such as a right triangular shape, defined by an upper inclined surface 40 and lower generally planar surface 41. The upper surface 40 may be inclined in the same general direction as the inclined supporting surface 38 of the projection 34 so as to provide an interlocking support for the clamping means 22, as will be described hereinafter.

Figure 6:
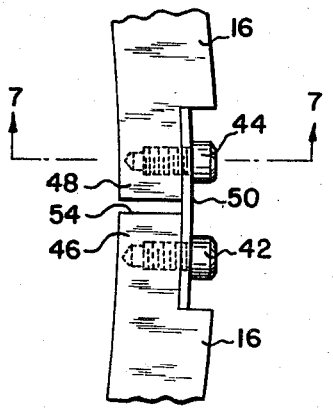
FIG. 6 is an enlarged fragmentary top elevational view of one of the filler members showing the split connections thereof.

The filler members 16 and 17 in the preferred form comprise endless rings generally identical in configuration which are disposed in superposed relation in the recess 18 and supported therein by the supporting projection 34. Since the ring members 16 and 17 are identical in construction only one will be described here in detail, with the parts of the other being designated by like reference numbers. The rings 16 and 17 are preferably split, as shown in FIG. 6, to facilitate their insertion into the recess 18, and also to enable them to be slipped over the mold body 11. After being placed in position in the recess 18, the confronting ends 46 and 48 may be connected together in any suitable manner, such as by means of a metal plate 50 which spans the juncture 54, ad which may be suitably fastened to the opposing ends 46 and 48 by means of the bolts 42 and 44 or the like. The rings 16 and 17 may be of any suitable configuration. Preferably the rings are polygonal shape, such as a parallelogram, in cross-section, each having a generally vertically extending inner 47 and outer 49 surfaces which are generally parallel to one another. The rings may also include an upper surface 50 which is generally parallel to a lower surface 52 both of which are angularly disposed with relation to the general plane of the inner surface 47 and outer surface 49.

Figure 5:
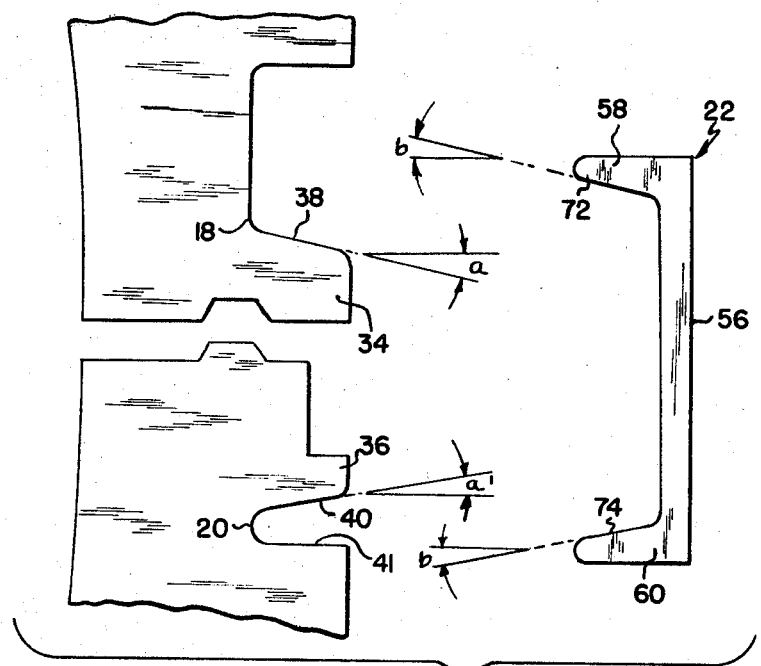
FIG. 5 is a fragmentary cross-sectional view showing the upper and lower sections of the mold of FIGS. 2 and 3 in superposed, spaced relation and with the clamping band removed from interlocking engagement therewith.
Figure 7:
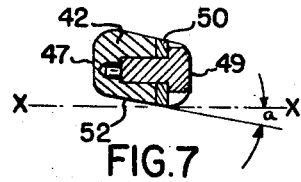
FIG. 7 is a cross-sectional view taken along the line 7—7 of FIG. 6.

As shown in FIG. 7, the opposed surfaces 50 and 52 of the respective filler rings 16 and 17 are preferably disposed at an angle $a$, such as about 10 degrees, with respect to the horizontal axis X—X of the mold 10. The inclined surfaces 38 and 40 of the projection 34 and the recess 20, respectively, are also preferably disposed at the same angle $a'$ of inclination as the surfaces 50 and 52, as seen in FIG. 5. By this arrangement, the upper surface 38 of the projection 34 (FIG. 2) will engage and support the confronting lower surface 52 of the adjacent ring, such as 17, while the upper surface 50 of such ring 17 will engage the confronting and parallel surface of the other ring, such as 16, when such rings are disposed in superposed engaged relation within the recess 18.

In the invention, the rings 16 and 17 each preferably has a maximum transverse dimension in transverse cross-section which is equal to one another, but with a combined dimension (width) which is preferably less than the maximum transverse width of the recess 18 when the rings are disposed in engaged inserted position therein. By this arrangement, prior to insertion of the clamping means 22 therein, the rings 16 and 17 are free to move relative to one another so as to frictionally engage the clamping means 22 after insertion therein. Accordingly, the rings 16 and 17 may be disposed in paired engaged relation adjacent the bottom of the recess 18 (FIG. 2), in spaced centered relation within the recess 18 (FIG. 3) or in paired engaged relation adjacent the top of the recess 18 (FIG. 4), as desired. Thus, the recess portions 18 and 20 can be provided in either one of the mold sections 12 or 14, but with the larger recess, such as 18, being adapted to receive the rings 16 and 17, or the larger recess, such as 18, may be provided in both mold sections 12 and 14 to receive filler member, such as 16 and 17, therein as aforesaid.

Figure 1:
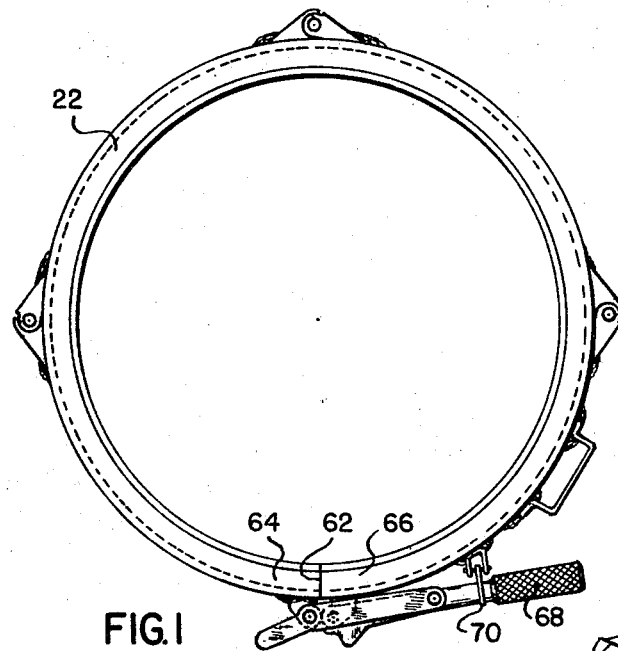
FIG. 1 is a top plan view of one form of clamping device for joining two mold sections together in accordance with the invention.

As shown in FIGS. 1 and 2, the expandable and contractible clamping means 22 may be disposed about the periphery of the mold 10 adjacent the exterior of the surface 32 so as to span the juncture of the mold sections 12 and 14. The clamping means 22 is adapted for interlocking coacting engagement in the recesses 18 and 20 with the rings 16 and 17 to securely hold the sections 12 and 14 together in superposed relationship. The clamping means 22 comprises a loop-like band (FIG. 1) which is preferably U-shaped in cross-section (FIGS. 2 to 4) having a body portion 56 with spaced apart, generally parallel flanges 58 and 60 extending generally radially inwardly therefrom in the direction toward the mold body 11 and which are adapted for insertion into the recesses 18 and 20.

The flanges 58 and 60 are preferably polygonal, such as right triangular, in shape so as to correspond with the recess portions, such as 20, provided in the mold section 14. Thus, the flanges include inner inclined surfaces 72 and 74 which extend divergently away from one another in a direction away from the body 56 of the clamping means and at an angle $b$ with respect to the horizontal axis of the mold body which corresponds to the aforementioned angles $a$ and $a'$ respectively. The transverse width of the body 56, together with the inclination of the flanges 58 and 60 is preferably such that the inner surface 72 will engage the top surface 50 of the upper ring 16 and the other opposed inner surface 74 will engage the inclined surface 40 of the recess portion 20. By this arrangement, as the body 56 of the clamping means 22 is drawn tightly around the mold sections 12 and 14, the flanges 58 and 60 are forced radially inwardly and into the recess portions 18 and 20 so that the upper flange 58 imparts a wedge-like force in an axial direction upon the adjacent upper ring 16 which force, in turn, is transmitted to the engaged lower ring 17 for squeezing the rings downwardly into frictional engagement against the projection 34. The inclined surfaces of the respective rings in conjunction with the inclination of the flange, such as 58, provides, in effect, a cam-like interaction between the parts for locking the mold sections 12 and 14 in engaged superposed relation.

In the invention, the body 56 of the clamping band may be split, as at 62, forming two opposed end portions 64 and 66 (FIG. 1) which may be joined together to provide the loop-like configuration shown by a hand actuated lever 68 of a type known in the art. The lever may be latched at one end, as at 69, to the end portions 64 and 66 of the band and is adapted to detachably mount at the other end, as at 70, to the mold body 11. By this arrangement, as the lever 68 is rotated in a clockwise direction (FIG. 1), the band is contracted around the mold sections 12 and 14 for imparting the interlocking coacting engagement of the flange, such as 58, with the filler rings 16 and 17, whereafter, the lever may be locked in place via the detachable mounting 70 during use of the mold. Upon detachment and rotation of the lever 68 in the opposite direction, the band is expanded for removal of the flanges 58 and 60 from the recess portions 18 and 20, whereupon, the mold sections 12 and 14 can be separated to provide access to the mold cavity 24.

Figure 3:
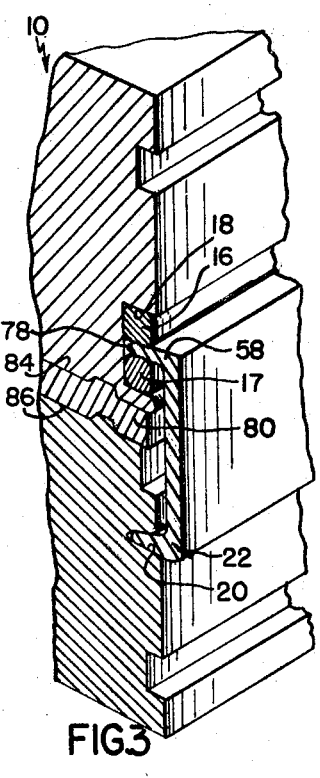
FIG. 3 is a fragmentary perspective section view of the mold in FIG. 2 in an expanded position thereof.
Figure 4:
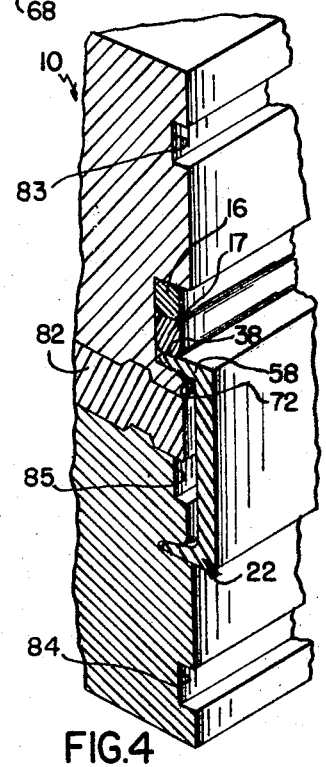
FIG. 4 is a fragmentary perspective section view of the molds of FIGS. 2 and 3 in a greater expanded position thereof.

When it is desired to increase the width of the mold, such as is shown in FIG. 3, the band 22 may be released and allowed to expand sufficiently to enable the marginal edge 78 of the flange 58 to clear the outer surface 49 of the upper ring 16 enabling the upper section 12 to be moved axially in a direction away from the lower section 14 and enabling the flange 58 to be selectively positioned between the upper ring 16 and the lower ring 17 respectively. When the mold sections 12 and 14 have been separated, a spacer member 80 may be interposed in the space between the side surfaces 26 and 28. The upper surface 84 and the lower surface 86 of the spacer 80 are adapted to matingly engage the upper surface 26 and the lower surface 28 of the sections 12 and 14, respectively, thereby maintaining the sections 12 and 14 in a predetermined separated position depending upon the thickness of the spacer member used. As the rings 16 and 17 are similar in configuration, and the height of the ring member 17 is made the same as the width of the spacer member 80, the sections 12 and 14 will again be joined together when the band is contracted in the manner as described.

When the mold is in the fully expanded position (FIG. 4), the flange 58 will be disposed at the bottom of the recess 18 with the inner surface 72 in abutting engagement with the upper surface 38 of the projection 34. A wider spacer member 82 equal in width to the combined height of the rings 16 and 17 may be provided so that the lower surface 72 of the flange 58 will properly engage the upper surface 38 of the projection 34 to provide sufficient pressure on the surfaces 38 and 40 to maintain the sections 12 and 14 securely in engagement with the spacer member 80.

The channels 83 and 84 and the recessed slot 85 provided in the mold sections 12 and 14 (FIGS. 2 to 4) are shown for purposes of completeness in the drawings, but do not have any bearing on the subject matter of the present invention. Thus, such portions could be eliminated and the mold sections could be a solid construction in these areas, as desired.

By the foregoing arrangement, a mold 10 is provided which may be selectively expanded to obtain a plurality, such as three or more sizes, of varying width while utilizing the same clamping band 22 in all cases. Although only a pair of ring members, such as 16 and 17, have been shown, it is to be understood that any number of rings and/or spacers may be provided to obtain any desired number of mold sizes. Moreover, though the rings have been described as being of a parallelogram shape, it is to be understood that the rings could be of other shapes, such as circular, square, oblate, etc., as desired.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:
1. A clamping device for use in mounting mold sections comprising,
an expandable clamping means adapted for releasable interlocking engagement adjacent the mating juncture of said mold sections,
and filler members adapted to be mounted on at least one of said mold sections for coacting engagement with at least one of said mold sections and said clamping means for holding said mold sections in engagement with one another.

2. A clamping device in accordance with claim 1, wherein
said clamping means comprises a loop-like band including a body portion and
flange means extending from said body portion adapted to be disposed in recess portions provided in said mold sections.

3. A clamping device in accordance with claim 2, wherein
said band is generally U-shaped in transverse cross-section.

4. A clamping device in accordance with claim 2, wherein
said clamping means includes selectively adjustable means operably connected to said band for selectively releasing said clamping means from interlocking engagement with said mold sections.

5. A clamping device in accordance with claim 1, wherein
said filler members comprise at least a pair of endless rings adapted to be disposed in said recess portions in at least one of said mold sections.

6. A clamping device in accordance with claim 2, wherein
said filler members are disposed between said flange means.

7. A clamping device in accordance with claim 2, wherein
said filler members are disposed interiorly and exteriorly of said flange means.

8. A clamping device in accordance with claim 2, wherein
said filler members are disposed exteriorly to said flange means.

9. A clamping device in accordance with claim 1, wherein
said flange means comprises a body portion and a pair of spaced apart flanges extending from said body portion.

10. A clamping device in accordance with claim 5, wherein
said rings are generally polygonal in configuration having opposite sides generally parallel to one another.

References Cited
UNITED STATES PATENTS

| | | | |
|---|---|---|---|
| 2,916,772 | 12/1959 | McDonald | 18—43 |
| 2,981,977 | 5/1961 | Fannen | 18—43 |
| 3,060,508 | 10/1962 | Duerksen | 18—43 X |

J. HOWARD FLINT, Jr., Primary Examiner

U.S. Cl. X.R.

18—18